United States Patent [19]
DeMarco

[11] Patent Number: 4,723,969
[45] Date of Patent: Feb. 9, 1988

[54] VACUUM LOADER AND PROCESS FOR REMOVING ASBESTOS AND OTHER HAZARDOUS MATERIAL

[76] Inventor: Thomas M. DeMarco, 5815 N. Cicero, Chicago, Ill. 60646

[21] Appl. No.: 910,072

[22] Filed: Sep. 22, 1986

[51] Int. Cl.⁴ .................... B01D 46/02; B01D 46/04
[52] U.S. Cl. .......................................... 55/97; 55/96; 55/302; 55/318; 55/467; 55/429; 55/500; 55/DIG. 3
[58] Field of Search ............... 55/96, 97, 302, 315, 55/318, 319, 321, 324, 344, 350, 356, 429, 466, 467, 500, DIG. 3

[56] References Cited

U.S. PATENT DOCUMENTS

| | | |
|---|---|---|
| 2,226,045 | 12/1940 | Baldwin ............................ 55/319 X |
| 3,308,609 | 3/1967 | McCulloch et al. .................. 55/319 |
| 3,877,900 | 4/1975 | Mitchell ............................ 55/429 X |
| 4,099,937 | 7/1978 | Ufken et al. ...................... 55/319 X |
| 4,229,193 | 10/1980 | Miller ................................. 55/318 |
| 4,367,080 | 1/1983 | Kordas ............................... 55/302 |
| 4,541,846 | 9/1985 | Sjordin ................................. 55/97 |
| 4,559,067 | 12/1985 | Darston ........................... 55/356 X |
| 4,578,840 | 4/1986 | Pausch ............................. 55/356 X |
| 4,581,050 | 4/1986 | Krantz ................................. 55/429 |

*Primary Examiner*—Charles Hart
*Attorney, Agent, or Firm*—Jeffrey M. Morris

[57] ABSTRACT

A specially arranged, five stage, four compartment, vacuum loader is provided to collect, remove, and dispose asbestos and other hazardous material in an efficient, effective, and safe manner without exposing surrounding personnel to the collected asbestos or other hazardous material.

18 Claims, 8 Drawing Figures

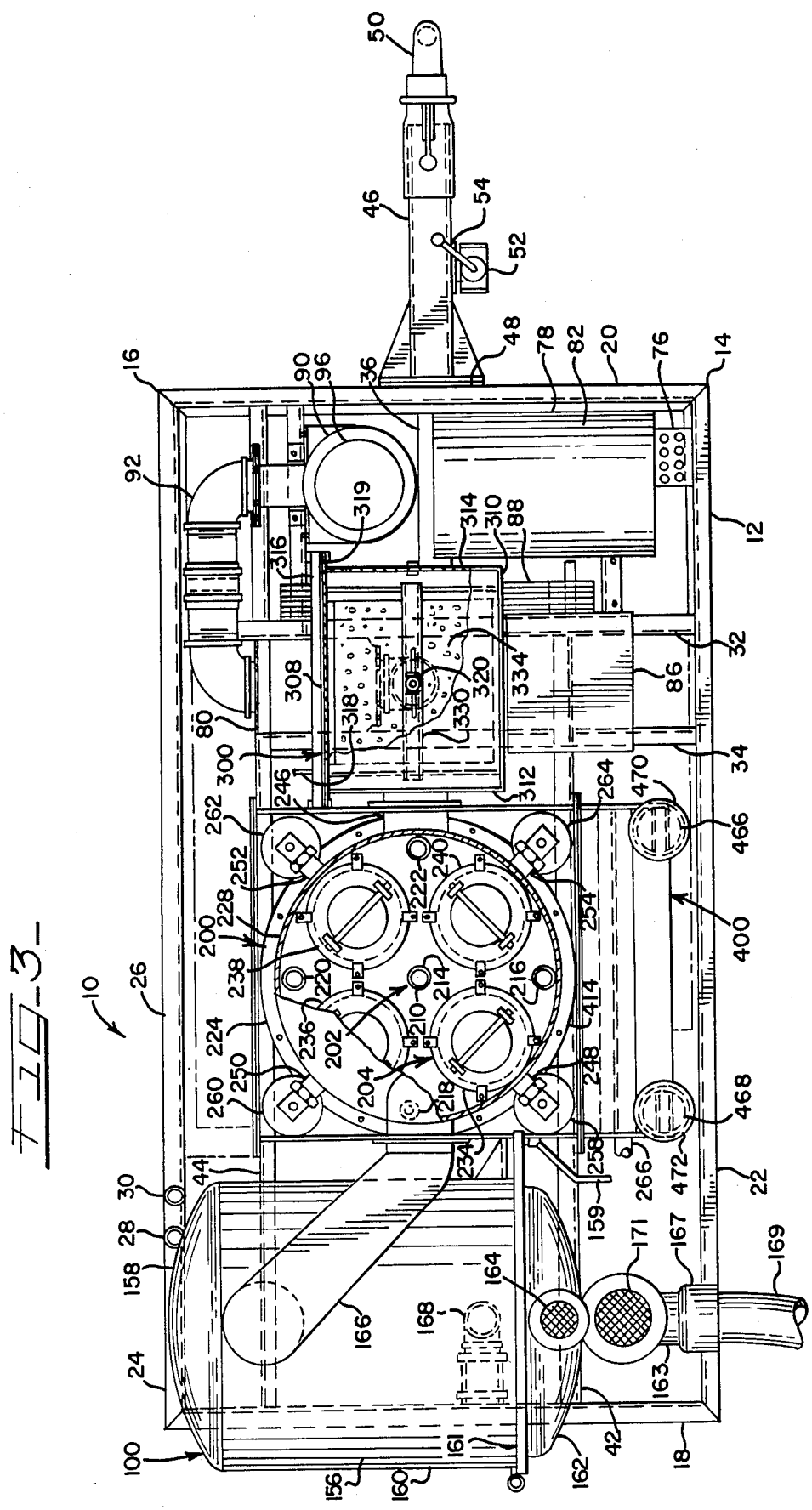

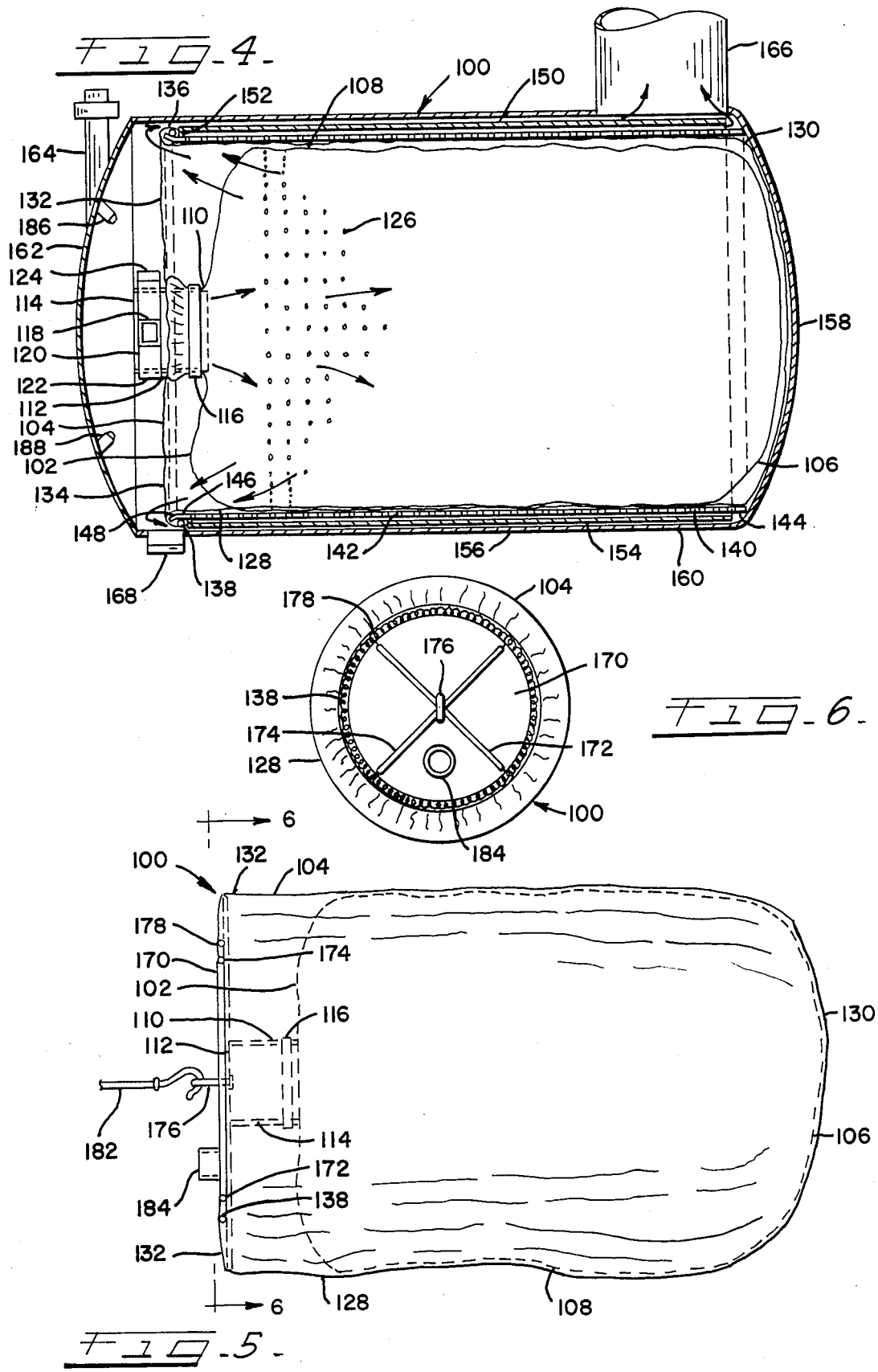

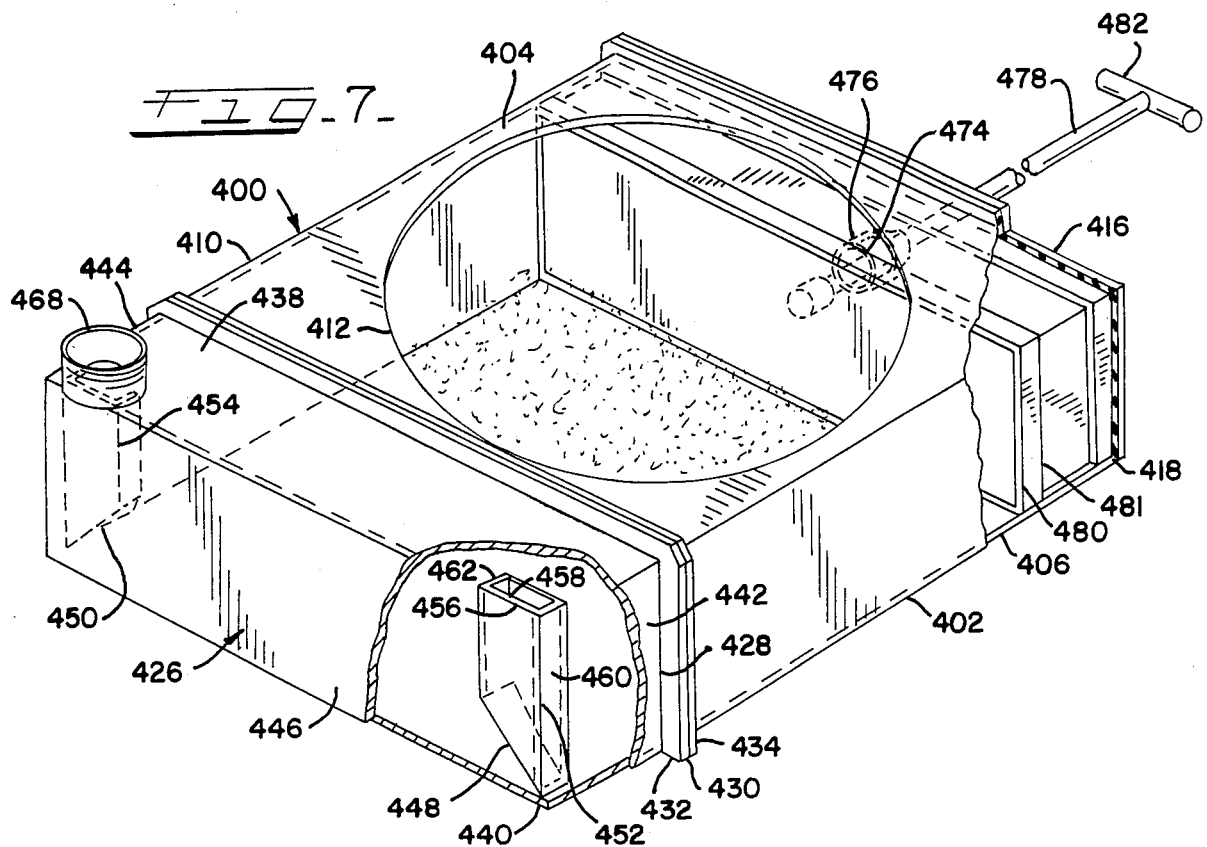
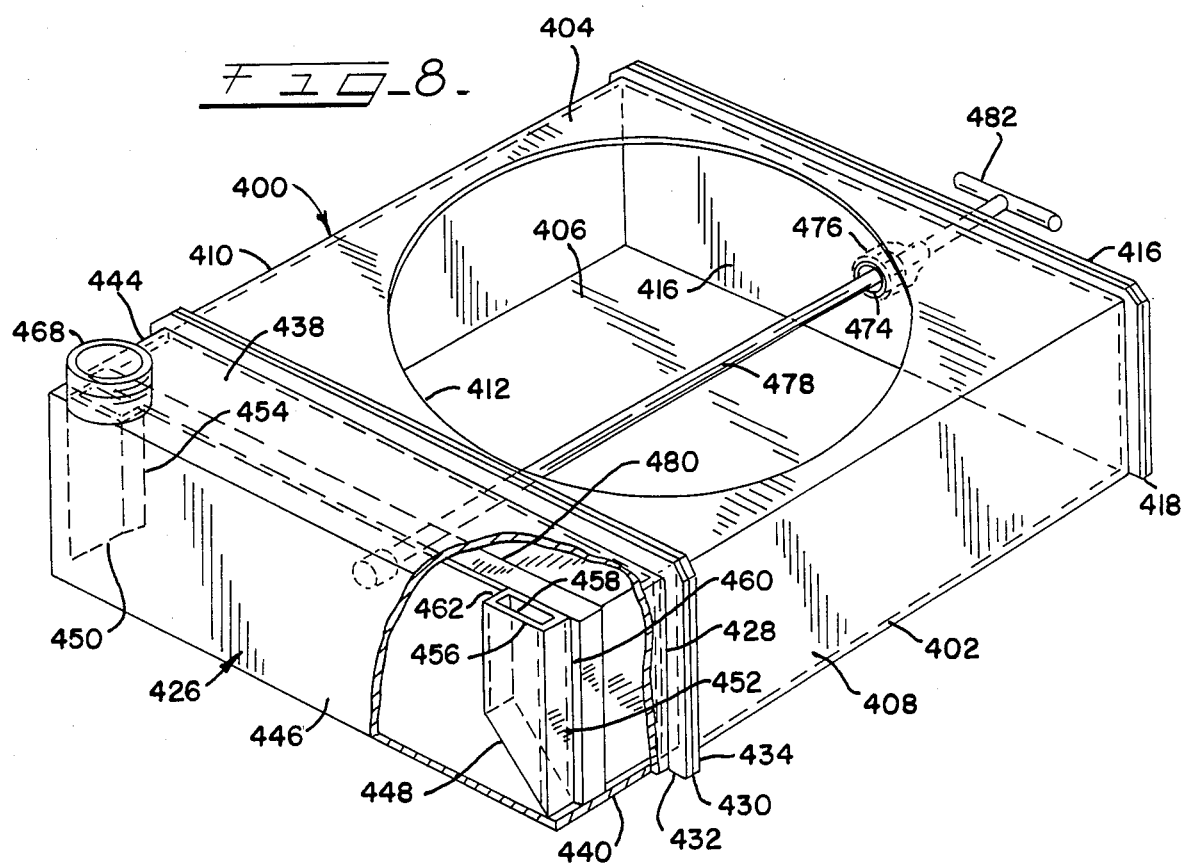

VACUUM LOADER AND PROCESS FOR REMOVING ASBESTOS AND OTHER HAZARDOUS MATERIAL

BACKGROUND OF THE INVENTION

This invention pertains to machines and processes for removing dry and wet liquid particulates, and more particularly, to a vacuum cleaner loader and process for removing asbestos and other hazardous materials.

Government studies and numerous health reports have linked exposure to asbestos fibers with serious diseases including asbestoses, fibrosis, and lung cancer. Asbestoses has also been thought to cause or aggravate other maladies, such as emphysema, tuberculosis, bronchitis, asthma, pneumonia, inflammations, and infections. Many people who worked in asbestos manufacturing plants or who were employed installing asbestos insulation, have developed cancer and died.

For many decades, asbestos was commonly used as an insulator for houses, schools, factories, and public buildings. Asbestos fibers are readily circulated in the air and are dangerous if inhaled. The presence of asbestos in insulation in buildings can be harmful and injurious to the health, safety, and well being of children and adults alike.

Contamination of buildings with asbestos insulation can be cured by removing the asbestos. Asbestos removal, however, is not easy. Various industrial vacuum cleaners, loaders, and collectors have been tried but have not been very effective. Furthermore, collection, and disposal of asbestos with conventional prior art equipment often exposes the operator and surrounding personnel to concentrated amounts of the collected asbestos, which can be dangerous, harmful, and even fatal.

Also, in industry, voluminous amounts of particulate matter, debris, dust, waste, and other hazardous material are emitted during machining, foundry, milling, shipment, warehousing, assembling, fabricating, and other manufacturing operations. Particulates of hazardous material emitted during a manufacturing operation can include metal slivers, plastic chips, wood shavings, dirt, sand, and other debris. Particulates accumulate on floors, machines, packaging materials, equipment, and personnel. Particulates of hazardous material can also be carried and circulated in the air and can be harmful, if breathed, swallowed, or stuck in an eye. Particulates of hazardous material can damage, erode, and adversely effect the efficiency and operability of equipment. Hazardous material can also pollute the atmosphere. It may also impair the quality of the products manufactured.

Asbestos emissions and emissions of other hazardous material are not only dangerous and troublesome, but are particularly aggravating and grievous in schools, houses, public buildings, and where relatively dust-free conditions and sterile environments are required, such as in food processing plants and medical supply houses.

Over the years, a variety of vacuum cleaners, loaders, collectors, and other equipment have been suggested for removing dust and debris and for other purposes. Typifying these vacuum cleaners, loaders, collectors, and equipment are those found in U.S Pat. Nos. 485,915, 795,412, 2,276,805, 2,372,316, 2,496,180, 2,604,956, 3,320,727, 3,485,671, 3,541,631, 3,554,520, 3,577,705, 3,608,283, 3,650,420, 3,717,901, 3,731,464, 3,780,502, 3,955,236, 3,970,489, 4,032,424, 4,062,664, 4,111,670, 4,174,206, and 4,224,043. These prior art vacuum cleaners, loaders, collectors, and equipment have met with varying degrees of success.

It is, therefore, desirable to provide an improved vacuum loader and process which overcomes most, if not all, of the preceding problems.

SUMMARY OF THE INVENTION

An improved vacuum loader is provided to remove, collect, seal, and dispose asbestos and other hazardous material without exposing surrounding personnel to the collected hazardous material. Advantageously, the vacuum loader is efficient, effective and safe. In the preferred form, the novel vacuum loader comprises a unique industrial asbestos and hazardous material collector with four special compartments and five stages.

The first bulk separator compartment provides a primary material collection receiver which makes a gross cut separation of the asbestos and other hazardous material. The bulk separator compartment has a vacuum tank which contains a impermeable outer bag. A porous or perforated inner bag is positioned within the outer bag and provides a sieve-like membrane that blocks and prevents the passage of and collects the elongated asbestos fibers and larger particulates of hazardous material while permitting passage of air and liquid containing asbestos fines and smaller particulates of hazardous material. The neck of the inner bag is secured to an inlet conduit. The outer bag is preferably positioned against an outer perforated shell which accommodates expansion of the bags. An annular shroud can cover the perforations of the shell to protect and prevent the exterior surface of the outer bag from being contaminated with asbestos fines and other hazardous material. One or more spray down nozzles can be located in proximity to the access door of the vacuum tank to accommodate a water wash (spray) down cycle prior to removal of the filled bags.

While the vacuum loader can be fixedly mounted in a stationary location, it is preferably mounted on a road trailer for mobility. Desirably, the road trailer has a tubular frame assembly which provides conduits and a water collection reservoir (basin) that can be connected to a drain pipe in the vacuum tank to receive contaminated water from the bulk separator compartment.

The vacuum loader also has at least one filtering compartments positioned downstream and connected to the bulk separator compartment to remove the remaining particulates of asbestos and other hazardous material. In the preferred form, there are two filtering compartments: a two stage filtering compartment, which provides the second compartment of the preferred vacuum loader, and a one stage Hepa-type filtering compartment, which provides the third compartment of the preferred vacuum loader. The two stage filtering compartment has a first stage containing a set of overhead nozzles and a lower second stage containing a set of annular filters. The one stage Hepa-type filtering compartment is positioned downstream of and connected to the two stage filtering compartment and contains a Hepa-type filter.

Preferably, the vacuum loader includes a fourth collector compartment comprising a dust settlement chamber which receives the filtered asbestos and other hazardous material from the two stage filtering compartment. In the preferred from, the dust settlement chamber has a reciprocating piston to compress and compact the collected filtered asbestos and other material. The compressed asbestos and other material is vacuumed back to the first bulk separator compartment.

The vacuum loader can also be equipped with a compressor engine, muffler and other equipment.

As used in this Patent Application, the term "dust" means particulate matter, debris and waste, including particulates of asbestos and/or other hazardous material.

The terms "dedust" and "dedusted" as used herein mean removing a substantial amount of dust.

The term "fines" as used herein means small, minute, particulates.

A more detailed explanation of the invention is provided in the following description and appended claims taken in conjunction with the accompanying drawings.

BRIEF DESCRIPTION OF THE DRAWINGS

FIG. 3 is a cross-sectional top view of the five stage, four compartment, vacuum loader;

FIG. 4 is an enlarged cross-sectional side view of the primary material collection receiver comprising the first bulk separator compartment of the five stage, four compartment, vacuum loader;

FIG. 5 is an enlarged cross-sectional side view of the primary material collection receiver with a closure plate secured against the sides of the outer bag and showing the hook of a forklift truck pulling the bags away from the interior of a vacuum tank;

FIG. 6 is a front view of the primary material collection receiver taken substantially along line 6—6 of FIG. 5;

FIG. 7 is a perspective view of the dust settlement chamber comprising the fourth collector compartment of the five stage, four compartment, vacuum loader with sections broken away for ease of understanding and clarity; and FIG. 8 is a perspective view of the dust settlement chamber with the piston moved against the vertical end air tubes and showing a section broken away for ease of understanding and clarity.

DETAILED DESCRIPTION OF THE PREFERRED EMBODIMENT

A five stage, four compartment, trailer mounted, portable vacuum loader 10 provides a heavy-duty vacuum-operated machine and industrial asbestos and hazardous waste (material) collector for efficiently vacuuming, effectively removing, compactly collecting, and safely disposing asbestos and other hazardous material comprising dry, wet, or fluid entrained, flowable materials such as fibers, slivers, chips, granular material, pellets, chunks, powders, slurries, liquids, particulate matter, debris, and/or waste. Advantageously, the vacuum loader removes, collects, seals, and disposes asbestos and other material without exposing the operator and other surrounding personnel to the collected asbestos or other collected material.

Trailer

Figure 1:
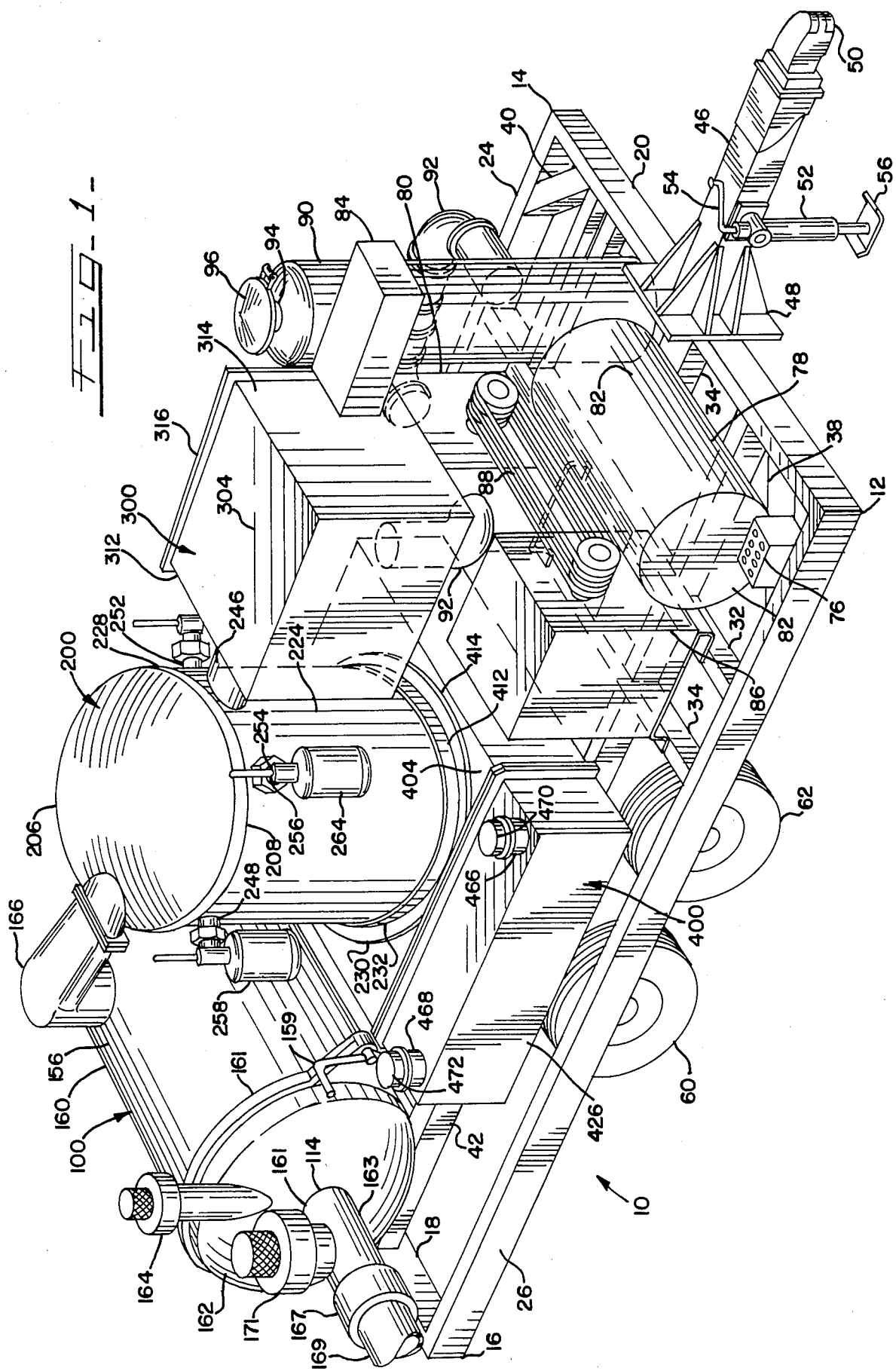
FIG. 1 is a perspective view of a five stage, four compartment, vacuum loader in accordance with principles of the present invention.
Figure 2:
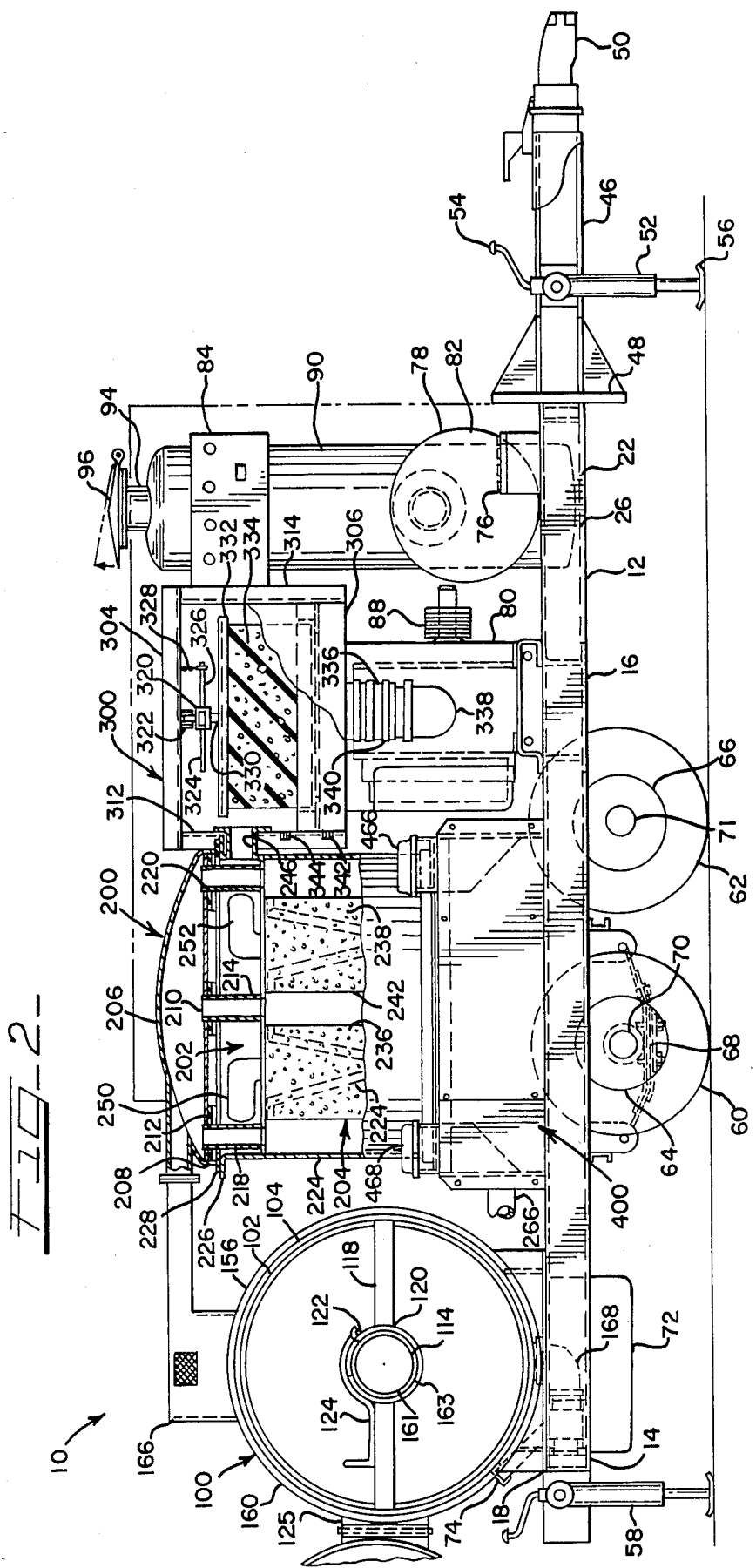
FIG. 2 is a cross-sectional side view of the five stage, four compartment, vacuum loader.

As shown in FIGS. 1–3, the vacuum loader preferably includes and is mounted upon a special portable, over-the-road, tandem axle, four wheel, trailer 12 to move the vacuum loader to and from various collection (hazardous waste) sites as well as to receive, collect, and contain contaminated water from the dedusting operation of the primary material collection receiver 100. The road trailer 12 has a trailer frame assembly 14 comprising a main frame made of carbon steel, stainless steel, anodized steel, or other metal. The main frame includes an annular peripheral frame 16 which is preferably rectangular in shape.

The annular peripheral frame 16 includes interconnected tubular bar or pipes 18, 20, 22, and 24, which provide conduits, a collection basin, and water reservoir 26 for receiving, collecting, and containing contaminated water from the first bulk separator compartment 100. The annular peripheral frame has a front end bar 18, which is connected to the water drain pipe 168 of the first bulk separator compartment 100, a rear end bar 20, which extends laterally and is positioned parallel to the front end bar 18, and parallel elongated side bars 22 and 24 which extend longitudinally between and are connected to the end bars 18 and 20. A water level site tube or window 28 (FIG. 3) is connected to the side bar 24 near the front end bar 18 to visually detect the water level in the water reservoir. A water outlet and trailer drain pipe 30 extends from the side bar 24 near the site tube 28 for discharging the water in the water reservoir, either by gravity or with an auxiliary suction tube. The water outlet is sealed with a closure cap when not in use.

Parallel transverse support bars 32 and 34 (FIGS. 1 and 3) extend laterally between and are connected to the sides bars 22 and 24 of the peripheral frame 16 in proximity to the rearward end 18 of the trailer assembly. A center support bar 36 extends longitudinally between and connects the transverse support bar 32 to the rear end bar 20 along the longitudinal centerline of the trailer assembly. Diagonal braces 38 and 40 diagonally connect the rearward portion of the side bars 22 and 24 to the rear end bar 20 about the rearward corners of the trailer assembly to enhance the strength and rigidity of the rearward portion of the trailer assembly. Parallel, elongated longitudinal bars 42 and 44 extend longitudinally between and connect the transverse bars 32 and 34 to the front end bar 18. If desired, the transverse and longitudinal support bars, as well as the diagonal braces can be formed of tubular conduits or pipes and fluidly connected and in communication with the water reservoir 26 to increase the water-carrying capacity of the reservoir.

As shown in FIGS. 1–3, the support bars 32, 34, 36, 42, and 44 and braces 38 and 40 of the main frame have sufficient strength and rigidity to readily support the first bulk separator compartment 100 comprising a primary material collection receiver and bag assembly, a second two stage filtering compartment 200, a third one stage Hepa-type filtering compartment 300, and a fourth collector compartment 400 comprising a dust settlement chamber, as well as other equipment.

The trailer has a tow bar 46 which extends rearwardly and longitudinally outwardly from the abutment plate or flange plate 48 of the rear end bar 20 along the longitudinal centerline of the trailer assembly. The tow bar has a drum ball tow coupler and tow hitch 50 to enable the vacuum loader to be pulled to the collection or storage site by a tow truck or other suitable vehicle equipped with a mating tow bar, ball, or hitch. The tow bar is connected to a top wind jack 52 with an upper crank 54 and lower base plate or foot 56. A front wind jack 58 can be connected to the front end bar 18. If desired, more jacks, such as four jacks, can be used. In use, the jacks level, stabilize, and balance the trailer and vacuum loader on driveways, inclined pavements, floors, and other surfaces at the collection site during stationary vacuum operation of the vacuum loader.

As best shown in FIG. 2, the underframe of the trailer assembly includes a set of wheel assemblies 60 and 62 positioned about the middle of the trailer. The wheel assemblies comprises four wheels and preferably have oil lubricated hub and drums 64 and 66, electric brakes 68, and tandem axles 70 and 71. The trailer assembly can also have a hydraulic surge braking system, break away safety chains, and a fire extinguisher.

Power Supply Equipment

A gas tank 72 (FIG. 2) with a gas inlet tube 74 is mounted to the trailer assembly near the front end bar 18. A battery 76 is seated upon and secured to the trailer assembly near the rear end bar 20. The gas tank and battery are connected to a drive engine packgage 78 mounted on the rearward portion of the trailer assembly.

The drive engine package 78 includes a V-belt driven air blower, vaccum pump, fan, or exhauster engine 80 and a compressor engine or compressor 82. The drive engine package is controlled by and operatively connected to a control panel 84. The air blower is operatively connected to and driven by a motor 86 via drive belts 88. The air blower (vacuum pump) creates a vacuum (suction) to draw dust and direct influent dusty air (air laden with particulates of of asbestos and/or other hazardous material) through an inlet conduit 114 of the first bulk separator compartment 100 comprising the primary material collection receiver.

A muffler 90 is connected to the exhauster engine 80 and the compressor 82 by a blower outlet conduit 92. The muffler 90 provides a silencer with an overhead discharge outlet 94 covered by an exhaust rain flap 96.

First Bulk Separator Compartment Primary Material Collection Receiver

The first bulk separator compartment 100 comprises a primary material collection receiver and bag assembly for making a gross cut searpation of the asbestos and large particulates of other hazardous material. The first bulk separtor compartment 100 separates, removes, collects, contains, sealing, and safely disposes asbestos and other hazardous material.

As shown in FIG. 4, the primary collection receiver 100 has an inner collection membrane bag 102 positioned within the interior of at least one outer protection membrane bag 104. The inner bag 102 has a closed concave rearward end or rounded bottom 106 and an elongated circular, tubular sidewall 108 which extends longitudinally (axially) forwardly from the bottom 106 and terminates in a neck 110 or top portion at its front end about an inner access opening and inlet 112. The neck 110 is detachably connected, compressibly secured, and clamped against a disposable plastic inlet tube 114 by a detachable collar 116 or hose clamp. The inlet tube 114 extends into the inlet access opening 112 of the inner bag.

As shown in FIGS. 2 and 4, a removable, inlet tube-retainer bar 118 and inlet tube-clamp assembly 120 comprising an over center hinged locking clamp 122 with a 5-shaped bar support 124 can be releasably connected and securely engaged to the inlet tube 114 at a location spaced forwardly of the inner bag 102 and collar 116 to help center and support the inlet tube 114. A drive guard 125 (FIG. 2) can also be provided.

The inner bag 102 (FIG. 4) is flexible and expandable within the interior of the outer bag 104 from a deflated storage position to an inflated expanded collection position. The sidewall 108 of the inner bag is porous, perforated, or foraminous with a set of pores, perforations, openings, apertures, or holes 126 to provide an array of fluid flow passageways. The fluid flow passageways 126 extend from a position spaced rearwardly of the neck 110 and inlet access opening 112 to a position in proximity to the closed bottom rearward end 106 of the inner bag. The fluid flow passageways 126 are of a size, shape, pattern, and matrix arrangement to block and prevent the passage of and collect elongated asbestos fibers and large particulates of hazardous matter while allowing the passage of fluid, such as air and water, containing smaller minute particulates of asbestos and/or smaller particulates of other hazardous material. The fluid flow passageways 126 provide a porous or sieve-like sidewall 108 which serves to make a gross cut separation of the larger particles of asbestos and other hazardous material from the asbestos fines and smaller particulates of hazardous material.

The outer bag 104 (FIG. 4) is spaced outwardly and positioned about the inner bag 102. The outer bag is flexible, solid, pliable, and imperforate. The outer bag is expandable about the exterior of the inner bag from a deflated storage position to an inflated expanded collection (vacuuming) position. Preferably, the outer bag 104 has a maximum diameter and expansion larger than the inner bag 102 so that the solid imperforate sidewall 128 of the outer bag is spaced radially outwardly of the perforated sieve-like sidewall 108 of the inner bag when the bags are in their expanded collection positions.

The outer bag 104 (FIG. 4) can be a single or double ply, membrane bag or a double bag. The outer bag has a closed concave rearward end or rounded bottom 130 and an imperforate, solid, elongated, circular tubular sidewall 128 which extends longitudinally (axially) forwardly from the bottom 130 and terminates in an open end or outer neck 132 at its front end about an outer access opening and outlet 134. The outer access opening 134 provides a mouth or outlet for the egress (exiting) of air and water containing asbestos fines and smaller particles of hazardous material. The outer rim or edge 136 of the open end of the outer bag is sewn or otherwise securely connected about or attached to an annular, circular, retainer spring 138 or circular draw string.

The outer and inner membrane bags can be made of canvas or other waterproof fabric, rubber, rubberized material, paper or paperboard coated or otherwise treated with water resistant material, or plastic, such as polypropylene, reinforced vinyl, or polyvinylchloride (PVC). Other materials can be used. For enhanced strength and more effective sealing, the sidewalls of the bags are preferably seamless.

As shown in FIG. 4, a rigid, open ended, foraminous, circular, inner tubular shell 140 provides an inner air distribution tube which is positioned diametrically outwardly and annularly about the sidewall 128 of the outer bag 104. Preferably, the interior (inner) surface of the inner shell has a maximum inside diameter less than the maximum diametric span of sidewall 128 of the outer bag 104 to engage the outer exterior surface of the outer bag's sidewall 128. The inner shell comprises an annular perforated tube with an array, matrix, and set of air holes, apertures, perforations, or openings which provide pneumatic vacuum passageways 142. The vacuum passageways provide for passage of air during use to create a vacuum suction which expands and draws the outer bag's sidewall against the interior surface of the inner shell.

The inner shell 140 (FIG. 4) has an open rearward end 144 positioned generally about the bottom of the outer and inner bags and an open forward end 146 positioned about the neck of the inner bag. The open forward end 146 of the inner shell provides an outlet opening with an outwardly flared lip or rim 148 which abuts against and supports the open end of the outer bag. During vacuum separation and collection, the annular retainer spring 138 is seated against the rearward portion of the flared lip 148 of the inner shell and the open end portion of the outer bag is stretched over the forward portion of the flared lip of the inner shell.

In order to protect and prevent backflow contamination of the outer exterior surface of the outer bag 104, a solid shroud 150 (FIG. 4) extends about the vacuum passageways 142 of the inner shell 140. The shroud 150 has an annular end 152, which extends diametrically outwardly from the forward end 146 of the inner shell in proximity to the flared lip 148, and has a rigid, elongated annular, circular skirt 154, which extends longitudinally (axially) rearwardly from the annular end 152 of the shroud to a position slightly forwardly of the rearward end 144 of the inner shell 140. The skirt provides a protective barrier to cover the vacuum passageways of the inner shell.

A rigid vacuum tank 156 (FIG. 1-4) provides a substantially solid outer shell which is positioned about, houses, and encloses the inner bag 102, inlet tube 114, outer bag 104, inner perforated shell 140, and shroud 150. The vacuum tank 156 has a rounded rearward end portion and concave bottom 158 to arcuately support and abut against the bottom of the outer bag 104, an elongated annular, circular sidewall 160 which extends longitudinally (axially) forwardly from the rearward end 140 of the tank, and a pivotable rounded concave lid, hatch or access door 162 which is hinged to the front portion of the sidewall of the tank to close the tank and permit access into the tank to insert, seal (close), and remove the inner and outer bags when the inner bag is filled with the collected material.

As shown in FIGS. 1 and 3, the door 162 can have as a handle and lock, such as a turn buckle latch or crank 159, and can be sealed to the sidewall of the tank by a door gasket 161 or other seal. An inlet pipe 163 (FIG. 3) extends longitudinally (axially) through the central portion of the door and is connected to the inlet tube 114. The inlet pipe 163 can be sealed to the inlet tube 114 by an inlet tube gasket 165 or other seal. The inlet pipe 163 can extend outwardly of the door and can terminate in a coupling 167 for attachment to a vacuum inlet hose 169 or suction line.

As shown in FIGS. 1, 3, and 4, a tank vacuum pressure, relief valve and vacuum breaker 164 can be connected to and extend from the door 162 of the tank to relieve the suction pressure and facilitate opening of the door. A material packing, vacuum pressure relief valve and vacuum breaker 171 can be connected to and extend radially from the inlet pipe 161 at a location spaced outwardly of the door 162 and bags to relieve and bypass the vacuum suction when the inner bag is filled, such as when the inner bag reaches a resistance pressure of 9 psi, as well as to permit intermittent periodic surges of air to clean the inlet tube and compress (pack) the collected asbestos and other material in the inner bag 102.

As shown in FIGS. 1-4, an overhead outlet tube 166 or tank discharge pipe extends radially outwardly and upwardly from the sidewall of the vacuum tank 156 in proximity to the tank's rearward end 158 and is connected to the second two stage filtering compartment 200. A water drain pipe 168 (FIGS. 2 and 4) extends radially outwardly and downwardly from the sidewall of the vacuum tank in proximity to the door 162 and flared lip 148 of the inner shell 140.

The sidewall 160 (FIG. 4) of the vacuum tank 156 is positioned about and spaced radially outwardly of the shroud 150 to provide an annular chamber therebetween for passage of air containing asbestos fines and smaller particulates of other hazardous material. The air containing the asbestos fines and particulates of other matter flow from the outlet opening 134, through the annular chamber, to the outlet tube 166 of the vacuum tank.

The vacuum tank 156, shroud 150, and inner shell 140 can be made of steel or other metal.

In order to safely seal and close the bags when the inner bag is filled with collected material, a circular closure plate or disc 170 (FIGS. 5 and 6) is provided. The closure plate is solid, substantially rigid, and impervious to the passage of asbestos and other hazardous material. The closure plate engages the open end of the outer bag 104 and closes the outer access opening 134 of the outer bag. The annular retaining spring 138 of the outer bag is removed from compressive engagement with the flared lip 148 of the inner shell 140 and slipped over the closure plate. The retaining spring 138 has a retracted (unexpanded) normal diameter smaller than the flared lip 148 of the inner shell 140 and the peripheral outer circular edge of the closure plate 170. Elastic draw cords 172 and 174 can be crisscrossed through an eyebolt or eyelet 176 and secured to the annular retaining spring 138 by S-hooks 178 as shown in FIG. 3. The eyebolt or eyelet 176 extends longitudinally outwardly (forwardly) from and is connected to the closure plate 170. An elongated hook 182 can be attached to the eyelet and pulled with a forklift truck to remove the closed sealed bags from the vacuum tank.

As shown in FIGS. 5 and 6, a vacuum hose connection or port 184 can extend longitudinally (axially) forwardly from the closure plate 170 for connection to a vacuum hose 266. The vacuum hose connection or port 184 is radially offset from the eyelet 176 and center of the closure plate 170.

The primary material collection receiver and bags of the first bulk separator compartment 100 produced unexpected surprisingly good results in removing, collecting, sealing, and disposing asbestos fibers and large particulates of hazardous material over conventional, prior art equipment and bags.

Second Two Stage Filtering Compartment

The second two stage filtering compartment 200 (FIGS. 1-3) is connected to the outlet conduit 166 of the first bulk separator compartment 100 comprising the primary material collection receiver and bag assembly. The two stage filtering compartment 200 has a first stage 202 comprising an upper nozzle chamber and a second stage 204 comprising a lower filter chamber.

As shown in FIGS. 1-3, the upper nozzle chamber (first stage) 202 has a domed roof or top 206 which is connected to and communicates with an intermediate conduit that provides the outlet conduit 166 of the first bulk separator compartment 100 comprising th primary material collection receiver. The domed roof 206 has a downwardly extending vertical skirt 20B. The upper nozzle chamber (first stage) 202 has an overhead array of downwardly facing ports, slots or nozzles 210 fluidly sealed by rubber o-rings, gaskets, or seals 212 for passing, conveying, and injecting the partially dedusted air containing asbestos fines and smaller particulates of hazardous material into the second stage 204 comprising the lower filter chamber.

The downwardly facing overhead nozzles 210 include a central nozzle 214, positioned in the center of the upper nozzle chamber 202 along the vertical axis of the second two stage filtering compartment 200, and a circular set, array, or series of four nozzles 216, 218, 220, and 222, which radially and circumferentially surround the central nozzle 214. While the above arrangement of nozzles are preferred for best results, a different arrangement of nozzles, or more or less nozzles or ports can be used, if desired.

As shown in FIG. 2, the lower filter chamber (second stage) 204 has an annular cylindrical or circular upright wall 224. The upper portion of the wall 224 has an outwardly extending, circular flange 226 which is sealed to the skirt 208 of the domed roof 206 by a rubber, annular circular gasket, o-ring, or seal 228. The lower portion of the upright wall 224 terminates in an outwardly extending, annular mounting flange 230 about a circular, filtered material discharge outlet 232. The mounting flange 230 is welded, bolted, or otherwise secured to the ceiling (top) 404 of the fourth collector compartment 400 comprising the dust settlement chamber. The circular, filtered material discharge outlet 232 communicates with the inlet opening 412 of the dust settlement chamber 400 to discharge and pass filtered asbestos and other filtered hazardous material from the second two stage filtering compartment 200 into the fourth collector compartment 400.

As shown in FIGS. 2 and 3, the second stage, lower filter chamber 204 contains a set of two, and preferably four, filter-canisters or primary tubular filters 234, 236, 238, and 240 which are positioned in a circular array. Each of the canisters contains a vertically positioned, tubular annular filter 242 and has a V-shaped retainer 244. While the preceding arrangement is preferred for best results, more or less filters can be used, if desired.

The downwardly facing overhead nozzles 210 (FIGS. 2 and 3) are arranged to cooperate with each other to direct the partially dedusted air containing asbestos fines and small particulates of other hazardous material, downwardly in a downwardly annular flow pattern about the outside of the filters 234-240, so that the air will pass inwardly through and be filtered by the filters. The filtered air is deflected and drawn upwardly through the centers of the tubular filters 234-240 and is discharged through a second compartment discharge outlet conduit 246, which extends radially outwardly of the upper portion of the upright wall 224 near the dome 206, into the third Hepa-type filtering compartment 300. The filters 234-240 partially filter and remove the asbestos fines and remaining particulates of hazardous material to provide an upwardly flow partially filtered stream containing a lesser concentration of particulates of asbestos or other hazardous material than the influent partially dedusted stream entering the second two stage filtering compartment 200.

In the two stage filtering compartment 200, the downwardly facing nozzles 210 of the first stage, upper nozzle chamber 202 provide forced downward air flow to remove asbestos fines and particulates of hazardous material by kinetic energy and the filters 234-240 of the second stage, lower filtering chamber 204 provide annular and lateral air flow to partially filter and remove most of the remaining fines and particulates. It has been unexpectedly and surprisingly found that the second two stage filtering compartment 200 produces unexpected surprisingly good results with superior downward distribution and partial dedusting of the dusty air by virtue of the kinetic energy of the fines and particulates as they leave the nozzles while the cleaner air is drawn laterally into the tubular filters 234-240.

As shown in FIGS. 1-3, reverse pulse filter cleaners comprising air injectors 248, 250, 252, and 254 extend radially outwardly from the upper portion of the upright wall 224 to periodically inject intermittent blasts of clean air upon the inside or outside of the tubular filters 234-240 to help clean the filters. The injectors are connected by pneumatic tubes or conduits 256 to an air supply source, such as compressed air canister, compressed air tanks, or an auxiliary compressor. In the illustrative embodiment, there is a circular array of four compressed air canisters 258, 260, 262, and 264 mounted about the exterior surface of the cylindrical upright wall of the filter chamber and there is a circular set or array of four downwardly facing, overhead air injectors 248, 250, 252, and 254 positioned above the center of the filters and connected to the compressed air canisters to sequentially inject pulses of compressed air into the center of the tubular filters to shake loose the dust collected, accumulated, or caked on the filters. More or less air injectors and compressed air canisters can be used. While the illustrated arrangement is preferred for best results, a different shaped array of air injectors and/or air canisters can be used, if desired. Furthermore, if desired, the air injectors can be positioned to inject air upon the outside of the filters.

The removed asbestos fines and partially filtered particulates collected and accumulated in the second two stage filtering compartment 200 is discharged into the fourth collector compartment 400 comprising the dust settlement chamber.

Third Single Stage Filtering Compartment

The third, one stage, Hepa-type filtering compartment 300 (FIGS. 1-3) has a chamber, housing, or Hepa-type filter tank 302 with a ceiling 304, a floor 306, upright side wall 308 and 310, and end walls 312 and 314. The right side wall 308 includes an access door 316 with a handle 318 for access into the interior of the third one stage filtering compartment 300. The door 316 is sealed to the end walls 312 and 314 by a rubber gasket or seal 319. The front end wall 312 is connected to and communicates with the discharge outlet conduit 246 from the second, two stage filtering compartment 200.

A turnbuckle and clevis hanger assembly 320 (FIG. 2) has an upper vertical bar 322 which is connected to and hangs downwardly from the ceiling 304 of the third one stage filtering. The turnbuckle and clevis hanger assembly 320 has a pair of cross bars 324 and 326 which can be hooked to the ceiling 304 by a chain 328. The turnbuckle and clevis hanger assembly 320 has a lower vertical bar 330 which is connected to a horizontal C-bar and filter support 332.

A Hepa-type filter 334 (FIG. 2) hangs downwardly from and is supported and carried by the C-bar and filter support 332. The Hepa-type filter 334 removes and filters the remaining asbestos fines and other particulates of hazardous material in the influent partially filtered stream from the second two stage filtering compartment 200. The Hepa-type filter can be a model 13XT absolute Hepa filter manufactured by Cambridge Filter Corporation of Syracuse, N.Y., having an efficiency of greater than 99.999% when tested with 0.12 micron thermally generated particles. Such filters have an X-body construction with tapered separtors for high capacity capabilities and exceed the leak-free scan requirements set forth in Federal Standard 209 when tested to a penetration level of 0.001%. These filters can also have a glass or a glass-paper media, aluminum separators, a 16 gauge steel casing, a urethane seal, and neoprene gaskets.

A discharge outlet and conduit, preferably comprising a rubber hose 336 (FIG. 2), is connected to and communicates with the floor 306 of the third one stage filtering compartment 300 and to the inlet tube and pipe toe 338 of the air blower 80, via hose clamps 340, to discharge the clean, filtered, purified air from the third one stage filtering compartment 300 to the air blower 80. The purified air is drawn (sucked) through the air blower 80 and passed through the muffler (silencer) 90 and safely discharged through the muffler's overhead discharge outlet 94 into the atmosphere or surrounding area.

The front end wall 312 of the third one stage filtering compartment 300 can have a lower full coupling 342 for operative connection to a 0-30" Hg vacuum gauge and a 0-5" water vacuum differential gauge and switch connection. The front end wall 312 of the third one stage filtering compartment 300 can also have an intermediate full coupling 344 for operative connection to a 0-5" water vacuum differential gauge and differential switch connection.

Fourth Collector Compartment Dust Settlement Chamber

The fourth collector compartment 400 (FIGS. 1-3, 7, and 8) comprises a dust settlement chamber, carryover collection chamber, and plenum chamber, which is located below and communicates with the second two stage filtering compartment 200 to receive, collect, contain, and gather the removed filtered asbestos fines and particulates of hazardous material from the second two stage filtering compartment before passing, discharging, and vacuuming the collected, compacted asbestos fines and particulates back to the first bulk separator compartment 100 comprising the primary material collection receiver.

As shown in FIGS. 7 and 8, the dust settlement chamber (fourth collector compartment) 400 comprises a rectangular settling tank and collection basin 402 with an open ended, horizontal top wall 404 providing a ceiling, an imperforate horizontal bottom wall 406 providing a floor, and elongated vertical side walls 408 and 410 which extend laterally between and transversely connect the ceiling 404 and floor 406 of the dust settlement chamber 400.

The ceiling 404 (FIGS. 7 and 8) of the dust settlement chamber 400 is mounted flush against and secured to the mounting flange 230 of the lower portion of the circular upright wall 224 of the second two stage filtering compartment 200. The ceiling 404 the the dust settlement chamber 400 has a circular inlet opening and hole 412 which is aligned in registration and communicates with the circular discharge outlet 232 of the second two stage filtering compartment to receive the filtered asbestos fines and particulates from the second two stage filtering compartment 200. Preferably, the inlet opening 412 and the discharge outlet 232 are about the same size and diameter. An annular, circular, sponge rubber gasket 414 seals the ceiling 404 of the dust settlement chamber 400 to the mounting flange 230 of the lower portion of the circular upright wall 224 of the second two stage filtering compartment 200.

A rod-supporting right end wall 416 (FIGS. 7 and 8) extends longitudinally between and connections the right hand end portions the side walls 408 and 410. A sponge rubber gasket 418 is mounted against the inner face of the rod-supporting right end wall 412.

As shown in FIGS. 1, 7, and 8, the left hand portion of the fourth collector compartment 400 comprises a gathering chamber, portion, or section 426. The gathering chamber 426 has an open ended, right hand portion 428 which communicates with the interior of the dust settlement chamber 400. The right hand portion 428 of the gathering chamber 426 has a composite seal 430 comprising a pure gum rubber diaphragm or flange 432 and an outer sponge rubber gasket 434 which seals the right hand portion 428 of the gathering chamber against the open ended, intermediate left portion 436 of the dust settlement chamber 400. The flange, diaphragms, and gaskets extend outwardly from the ceiling and sides of the dust settlement chamber 400.

The ceiling portion 438 (FIGS. 7 and 8) of the gathering chamber 426 is aligned and in coplanar relationship with the ceiling 404 of the dust settlement chamber 400. The floor portion 440 of the gathering chamber 426 is aligned and in coplanar relationship with the floor 406 of the dust settlement chamber 400. The vertical side portions 442 and 444 of the gathering chamber extend vertically between and connect the ceiling portion 438 and the floor portion 440 of the gathering chamber and are aligned and in coplanar relationship with the sides 408 and 410, respectively, of the dust settlement chamber. The solid, imperforate, left end wall 446 of the gathering chamber 426 extends longitudinally between and connects the side portions 442 and 444 of the gathering chamber and extends vertically between and connects the ceiling portion 438 and floor portion 440 of the gathering chamber to provide a closed left portion of the gathering chamber and collection compartment 400.

The gathering chamber 426 (FIGS. 7 and 8) receives gathered and compressed (compacted) particulates of asbestos and other material. Vertical end air tubes 452 and 454 extend vertically upwardly from the floor portion 440 of the gathering chamber 426 and are positioned against the side portions 442 and 444, respectively, end wall 446, and corners of the closed left portion of the gathering chamber 426. The vertical and air tubes 452 and 454 are symmetrical and about the same size and height. Each of the vertical end air tubes 452 and 454 have a rectangular cross section 458 with an inclined or beveled open bottom end 448 or 450 positioned inwardly at an angles of about 30 degrees to about 60 degrees, preferably about 45 degrees. The inward side 462 of each vertical end air tube 452 and 454 is shorter than the outward side 460 of each vertical end air tube 452 and 454.

As shown in FIG. 2, the fourth collector compartment 400 has an inlet air pipe and vent (suction) conduit portion 466 which extends above the right hand ceiling portion of the gathering chamber 426 and has an outlet pipe and discharge conduit portion 468 which extends above the left hand ceiling portion of the gathering chamber 426. The right inlet air pipe and conduit portion 466 is aligned and in communication with the right vertical end air tube 454. The left outlet pipe and conduit portion 468 is aligned and in communication with the left vertical end air tube 452. Preferably, the inlet and outlet pipes 466 and 468 are of a similar size and height. In order to evacuate and empty the compacted asbestos and other hazardous material in the fourth collector compartment, an auxiliary hose or the vacuum inlet hose 169 is connected to the outlet pipe 468 and to the inlet tube 114 of the first bulk separator compartment 100 comprising the primary material collection receiver and the inlet pipe 466 is left open to draw in ambient suction air to vacuum, pass, and convey the compacted asbestos and other hazardous material in the fourth collector compartment 400 to the first bulk separator compartment 100.

As shown in FIG. 1, closure caps 470 and 472 close, seal, and cover the inlet and outlet pipes 466 and 468, respectively, when the fourth collector compartment 400 is not being evacuated and emptied.

As shown in FIGS. 7 and 8, the central middle portion of the rod-supporting, right end wall 416 of the dust settlement chamber has a hole or opening 474 about a rubber sleeve 476 or seal which slidably receives an elongated push pull rod 478. The left end of the rod 478 is connected to the central middle portion of a rectangular moveable, solid vertical wall 480 providing a piston and diaphragm. The rectangular periphery of the piston 480 slidably engages the ceiling 404, floor 406, and sides 408 and 410 of the dust settlement chamber 400 and the ceiling portion 438, floor portion 440, and side portions 442 and 444 of the gathering chamber 426 of the fourth collector compartment. The piston 480 is reciprocatingly pushed, driven, and slid by the rod 478 to move, compress, and compact the filtered asbestos fines and particulates of other hazardous material collected in the dust settlement chamber 400 against the end wall 446 of the gathering chamber 426 for subsequent vacuuming to the first bulk separator compartment 100 comprising the primary material collection receiver. A gum rubber gasket or seal 481 can be mounted about the periphery of the piston. The rod 478 can be power driven by an engine, motor, or other suitable machinery or can be manually driven, reciprocatingly pushed, and pulled, such as with a manually grippable handle 482 comprising a crossbar at the right end of the rod 478. The handle is located and spaced laterally outwardly from the right end wall 416 of the dust settlement chamber 400.

Operation

In operation, the inner and outer bags 102 and 104 are installed in the vacuum tank 156 of the first bulk separator compartment 100 comprising the primary material collection receiver as shown in FIG. 4 and the door 162 of the vacuum tank 156 is closed as shown in FIG. 1. The V-belt driven, air blower engine 80 is then started and idled, such as at 650 rpm for a warm-up period. During this period, the tank door vacuum pressure relief valve (vacuum breaker) 164 and the material packing, vacuum relief valve (vacuum breaker) 171 are open and air will not flow through the vacuum inlet hose 169 and inlet tube 114. The air compressor 84 is then started to provide air pressure, such as 40 psi or 100 psi, for reverse-pulse air cleaning of the primary tubular filters and operation of the vacuum breakers 164 and 171.

The electrical control panel 84 is activated (energized) to start the four step repeat cycle sequential timer for reverse-pulse cleaning of the four primary tubular filters 234–240. The control panel 84 also provides 12 volt power for operation of the double solenoid valves connected to the vacuum breakers 164 and 171 through a vacuum switch and relays, as well as for operation of the solenoid air valves for reverse-pulse cleaning of the primary tubular filters 234–240. The control panel has gauges which indicate the vacuum in inches mercury (Hg) at the pump, a primary filter differential gauge, and a final Hepa filter differential gauge, engine gauges, and indicating warning lights.

The throttle of the blower engine 80 is then moved to increase the speed of the air blower, such as to 2600 rpm, to attain the desired suction and vacuum pressure. The vacuum button of the control panel 84 is then depressed to commence vacuuming. This will close the tank door vacuum relief valve (vacuum breaker) 164 connected to the tank door 162 and the material packing, vacuum relief valve (vacuum breaker) 171 connected to the inlet pipe 163.

Asbestos and other hazardous material are vacuumed into the first bulk separator compartment 100 comprising the primary material collection receiver 100 through the inlet hose 169, pipe 163, and tube 114 at a vacuum suction pressure, e.g. 18" Hg. The air flow carrying the material vacuumed into the inlet tube 114 will flow rearwardly into the perforated inlet collection bag 102 where the asbestos fibers and larger particulates of vacuumed material will be deposited and collected. The air exits the inner collection bag 102 by flowing outwardly through the holes or pores providing the fluid flow passageways 126 of the inner bag.

The effluent air containing asbestos fines and smaller particulates of vacuumed matter then flows forwardly through the gap (space) between the inner perforated bag 102 and the outer solid bag 104 which has been expanded and pulled against the perforated inner tube comprising the inner shell 140 by air flowing radially outwardly through the perforations 154 of the inner shell. The air gap between the inner and outer bags will be maintained by the air flow because of the pneumatic circuitry provided by the primary material collection receiver 100. The solid outer bag 104 provides secondary containment for the collected material in the inner bag 102.

The effluent air containing asbestos fines and smaller particulates of vacuumed matter exits the outer access opening (outlet) 134 of the outer bag and passes rearwardly through the annular chamber (gap) between the shroud 150 and the tank's circular sidewall 160 into the outlet tube 166 for passage to the second two stage filtering compartment 200. The shroud 150 protects the exterior outer surface of the outer bag 104 from becoming dusted and contaminated with entrained asbestos fines and particulates being carried by the exiting air in the annular chamber between the shroud 150 and the tank's circular sidewall 160.

During vacuuming, the asbestos fibers and other particulates collected in the inner perforated bag 102 become packed and compressed. The packing of vacuumed material in the perforated inner bag 102 is the result of resistance to air flow through the collected material in the inner bag as the inner bag fills. As filling progresses, the resistance to air flow at the vacuum pump, air blower, or compressor will increase, causing the asbestos fibers and other particulates to be packed and compress tighter together, leaving less voids (gaps) between the collected material until a significant mass resistance to flow reaches, such as at about 18" Hg. Lesser or greater vacuum pressures will cause lesser or higher densities of the collected material load.

The partially dedusted air stream is passed laterally through the outlet conduit 166 of the vacuum tank 156 into the first stage, upper nozzle chamber 202 of the second two stage filtering compartment 200 and injected downwardly by the nozzles or ports 210 to the second stage, lower filtering chamber 204 about the outside of the tubular filters 234–240. The air is then passed laterally and radially inwardly through the tubular filters 234–240 and deflected upwardly through centers of the tubular filters 234–240 for discharge through the outlet 246 of the second two stage filtering compartment 200 into the third single stage Hepa-type filtering compartment 300. The second two stage filtering compartment 200 partially filters and removes the asbestos fines and other remaining particulates of hazardous material.

The Hepa-type filter 334 of the third one stage filtering compartment 300 removes and filters the remaining asbestos fines and other particulates of hazardous material in the partially filtered stream from the second two stage filtering compartment 200. The clean, filtered, purified air from the third one stage filtering compartment 300 is discharged through the third compartment discharge outlet and hose 336 to the air blower 82. The purified air is drawn (sucked) through the air blower 82 and passed through the muffler (silencer) 90 and exits through the muffler's overhead discharge outlet 94 for safe discharge to the surrounding area, environment, or atmosphere.

The fourth collector compartment 400 comprising a dust settlement chamber, carryover collection chamber, and compressions chamber, receive, collect, contain, and gather the removed filtered asbestos fines and particulates of hazardous material from the second two stage filtering compartment 200 before passing, discharging, and vacuuming the collected, compacted asbestos fines and particulates to the first bulk separator compartment 100 comprising the primary material collection receiver. The asbestos fines and particulates of other hazardous material from the second two stage filtering compartment 200, exit the open bottom discharge outlet 232 of the second two stage filtering compartment 200 and enter the open ended ceiling 404 of the the fourth collector compartment 400 and gravitate to the floor 406 of the dust settlement chamber. Periodically, the piston 480 is reciprocatingly pushed, driven, and slid by the rod 478 to move and gather the filtered asbestos fines and particulates of other hazardous material collected in the dust settlement chamber against the end wall 446 of the gathering chamber 426 for subsequent vacuuming to the first bulk separator compartment 100 comprising the primary material collection receiver.

The carryover collection chamber providing the fourth collector compartment 400 is emptied by externally sealed vacuuming the carryover asbestos fines and particulates of hazardous material back into the primary material collection receiver 100 for sealed disposal. In order to evacuate and empty the compacted asbestos and other hazardous material in the fourth collector compartment 400, an auxiliary hose or the vacuum inlet hose 169 is connected to the outlet pipe 468 and to the inlet tube 114 of the first bulk separator compartment 100 comprising the primary material collection receiver and the inlet pipe 466 is left open to draw in ambient suction air to vacuum, pass, and convey the compacted asbestos and other hazardous material in the fourth collector compartment 400 to the first bulk separator compartment 100. The inlet and outlet pipes 466 and 468 are capped by closure caps 470 and 472 when vacuuming of the fourth collector compartment 400 is completed.

It is desirable that the vacuumed material remain in the container (bag assembly) into which it has been collected and that this same container be sealed within the vacuum tank 156 prior to removal for disposal. It is also desirable to pack and de-aerate the material in the collection container so that a dense load can be achieved and disposed of with minimal amount of dead air in the load. The vacuum loader 10 provides all of these features. With the vacuum loader 10 the vacuumed material will be collected in a filter-collection bag 102 while an outer solid pliable plastic bag 104 is in place surrounding the inner bag 102 during the time it is being filled. After filling the inner bag 102. The outer bag 104 will be tied and sealed around the inner bag 102 for sealed disposal. The vacuum loader 10 provision for packing and de-aerating material, fibrous or otherwise, into the inner collection-filter bag 102 is accomplished by pulling a high vacuum on the collected material which is provided by a positive displacement vacuum pump 80. The packing and de-aerating of material in the bag is the result of resistance to air flow through the material as the collection-filter bag 102 fills. As the filling progresses, so will the resistance to air flow to the pump increase, thus packing the fibers and particles tighter together and leaving less and less air gaps between the fibers and particles until the mass resistance to flow reaches about 16" or 18" mercury (Hg) vacuum at which time the vacuum pump will automatically stop after a twenty second time delay.

Vacuuming in the first bulk separator compartment 100 comprising the primary material collection receiver continues until the inner collection bag 102 is filled with asbestos or other vacuumed material. This will be signaled when the vacuum switch and gauge reaches a steady vacuum pressure, such as 16" or 18" Hg. for more than twenty seconds, at which time the material inlet tube vacuum breaker 171 connected to the inlet pipe 163 will open to stop vacuuming and clear the collection bag entry pipeline of the vacuumed material. After a short delay, the vacuum beaker 164 connected to the tank door 162 will open to relieve the vacuum in the tank so that the tank door 162 can be opened and the filled bag removed. The air blower 80 and compressor 82 will remain running to provide continuous ventilation to the operator when the operator opens the tank door 162, thereby exhausting any particulate matter away from the operator while the door 162 is open.

The material inlet tube vacuum breaker 171 connected to the inlet pipe will open when a high resistance through the collected material load in the perforated inner bag 102 is reached. This will allow atmospheric air to flow in through the material inlet tube vacuum breaker at a high volume and through the collected material; this change of pressure can be sensed by a high vacuum switch at the vacuum pump, air blower, or compressor. The instantaneous high flow of air through the collected material in the perforated inner bag 102 will cause the collected material to become even more dense (compressed). It will also cause vacuuming to cease, as well as sweep the material entry tube (inlet tube) 114 clear of vacuumed material so that when the tank door 162 is opened, the collected material will not fall out. The inlet tube 114 can then be immediately capped by the operator.

After the inner bag 102 is filled with the vacuumed matter, a water spray of recycled and filtered water is injected into the vacuum tank 156 about the tank door 162 and surrounding areas by one or more tank water nozzles, such as by a pair of diametrically opposite nozzles 186 and 188 located near the top and bottom portions of the tank door 162, pointed longitudinally rearwardly and at an angle of inclination of about 45 degrees towards the center of the bags, and connected to an external hose and water supply tank. The water is discharged (drained) into the drain pipe 168 to the water reservoir 26 in the trailer 12. The water in the reservoir 26 can be periodically emptied through the trailer outlet conduit and drain pipe 30.

After the water wash down cycle, the operator can then unlatch and swing the tank door 162 open. Immediately thereafter, the inner bag retainer bar 118 is removed from the inlet tube 114 by releasing the over center locking clamp 124. The closure plate 170 is then immediately placed (pushed) into the front open end 132 of the outer bag 104 to cover the disposable inlet tube 114 and close the outer bag 104. The closure plate will evacuate any free air contained between the inner and outer bags 102 and 104 as well as any free air inside the inner bag 102 which will minimize excess air in the collected load. Thereafter, the operator will pull the outer membrane bag retaining spring 138 over the flared end (lip) 148 of the perforated tube comprising the inner shell 140, which is welded or otherwise permanently secured to the vacuum tank, and snap the retaining spring over the outside surface of the closure plate 170. The retaining spring 138 will draw the closure plate firmly against the inlet tube 114 as well as tighten the outer membrane bag 104 against the inner membrane bag 102. The outer membrane bag 104 can be further tightened against the circular edge of the closure plate 170 by installing and hooking elastic draw cords or springs 172 and 174 across the span of the retaining spring 138. The three inch vacuum hose 266 can be connected to a hose port in the second two stage filtering compartment 200 to withdraw excess air from the bag assembly. Thereafter, the three inch hose 266 can be disconnected from the closure plate 170 and the auxiliary three inch vacuum hose connection 184 capped.

The filled, sealed, inner and outer membrane bags can then be pulled out of the vacuum tank 156 by connecting an elongated hook 182 chained to the tines of a forklift truck, to the eyebolt or eyelet 176. The filled, closed, sealed bags 102 and 104 can then be pulled out of the vacuum tank by the forklift truck. The forklift truck can then lift the filled bags and transport the filled bags to a waste disposal cite.

The operator can place a new solid outer bag 104 in the vacuum tank 156 and retain the outer bag by pushing the rim (open end) of the outer bag upon the flared lip of the perforated tube comprising the inner shell 140. A new perforated inner collection bag 102 can then be placed inside the outer bag and its neck 110 secured to another disposable inlet tube 114, such as with a band, hose clamp, or collar 116. The inlet tube can be secured to the vacuum tank by connecting the retainer bar 118 to yoke-type supports located inside the vacuum tank. The tank door 162 can then be closed and secured by locking the turn buckle latch. The primary material collection receiver 100 is then ready to continue vacuuming by repeating the operating sequence discussed above.

The power unit with the Hepa-type filter and gasoline engine drive package provide the air flow for conveying the asbestos and other hazardous material in the vacuum hose, such as at up to 16" or 18" mercury (Hg) vacuum. The exhauster can be driven by a 65.9 bhp gasoline engine and can have a 50 gallon reserve gas tank 72. The exhauster engine and the compressor engine can each have a manual starter switch and throttle.

The primary filtration package comprising the second two stage filtering compartment 200 before the Hepa filter 334 is continuously cleaned during vacuuming to prevent clogging and excessive buildup of carryover material on the tubular filters 234–240 and to facilitate the continuous running of the exhauster without shut down during periods of conveying asbestos and other hazardous material, as well as during periods of removal of the filled and sealed bags 102 and 104 from the primary material collection receiver 100. The 12 volt electrical control panel 84 controls the automatic cycling of the filtration cleaning syste and the vacuum breaker system.

Applicant's special vacuum loader produced unexpected surprisingly good results in removing, collecting, containing, sealing, and disposing asbestos fibers and other hazardous material over conventional vacuum loaders.

Among the many advantages of the four compartment, five stage, vacuum loader are:
1. Excellent separation and removal of asbestos fibers and large particulates of hazardous material.
2. Better solids-gas separation.
3. Compact collection of asbestos and other material.
4. Superior containment and sealing of the collected material.
5. Enhanced air purification.
6. Greatly reduced operator exposure to asbestos.
7. Good load-carrying, collection capacity.
8. Greater efficiency of operation.
9. Excellent dedusting.
10. Cost effective.
11. Economical.
12. Easy to install, remove, and repair.
13. Simple to use.
14. Less maintenance.
15. Effective.
16. Efficient.
17. Dependable.
18. Safe.

Although an embodiment of the invention has been shown and described, it is to be understood that various modifications and substitutions, as well as rearrangements of parts and process steps, can be made by those skilled in the art without departing from the novel spirit and scope of this invention.

What is claimed is:

1. A vacuum loader for removing asbestos and other hazardous material, comprising:
a first bulk separator compartment providing a primary collection receiver for partially dedusting an influent stream laden with absbestos or other hazardous material, said first bulk separator compartment comprising a tank containing a substantially solid imperforate outer bag and a forminous, fluid permeable inner bag, said inner bag comprising a sieve-like membrane defining a set of fluid flow passageways for substantially permitting passage of air and liquid containing smaller particulates of asbestos or other hazardous material while substantially blocking an preventing passage of larger particulates of asbestos and other hazardous material;

an inlet conduit connected to said first bulk separator compartment for feeding influent air or other fluid carrying asbestos or other hazardous material to said bulk separator compartment;

a two stage, second filtering compartment having a first stage comprising a nozzle chamber and a second stage comprising a filter chamber, said filter chamber containing a set of filters for partially filtering the partially dedusted stream as the partially dedusted stream moves laterally and radially inwardly through said filters to provide a partially filtered stream containing a lesser concentration of particulates of asbestos or other hazardous material than the influent partially dedusted stream, said nozzle chamber being operatively connected to and communicating with said first bulk separator compartment and said filter chamber, said nozzle chamber having a set of nozzles for directing the partially dedusted stream about said filters in said first chamber;

a third, one stage filtering compartment connected to and positioned downstream of said second compartment and comprising a filter for substantially dedusting and removing the remaining particulates of asbestors and other hazardous material from said partially filtered stream;

an intermediate conduit connecting said first bulk separator compartment to said two stage, second filtering compartment;

a discharge conduit extending from said third filtering compartment for discharging dedusted air; and a vacuum pump selected from the group consisting of an air blower, fan, pneumatic pump, and compressor, connected to said discharge conduit for drawing asbestos or other hazardous material from an external area laden with asbestos or other hazardous material into said first bulk separator compartment.

2. A vacuum loader in accordance with claim 1 wherein said bulk separator compartment includes a perforated shell annularly surrounding said outer bag, and a substantially solid shroud having an annular skirt annularly spaced between said perforated shell said outer bag for providing a protective barrier to substantially prevent backflow contamination of asbestos or other hazardous material on the exterior surface of said outer bag.

3. A vacuum loader in accordance with claim 1 including a fourth collector compartment comprising a dust settlement chamber positioned downstream, connected to, and communicating with said second filtering compartment for receiving the filtered particulates of asbestos and other hazardous material from said second compartment, said dust settlement chamber comprising a settling tank, means for compressing said removed particulates of asbestos and other hazardous material, and a gathering portion for receiving said compressed particulates of asbestos and other hazardous material.

4. A vacuum loader in accordance with claim 3 including at least one air tube positioned in proximity to said gathering portion to facilitate discharge of said gathered asbestos and other hazardous material, and compressed asbestos passage means for passage of said compressed asbestos and other hazardous material from said air tube to said inlet conduit and into said foraminous inner bag of said first bulk separator compartment.

5. A vacuum loader in accordance with claim 1 wherein said third filtering compartment comprises a Hepa-type filter.

6. A vacuum loader in accordance with claim 1 wherein said second filtering compartment includes a set of injectors for periodically injecting intermittent blasts of air upon said filters to help clean said filters.

7. A vacuum loader for removing asbestos and other hazardous material, comprising:

a first bulk separator compartment providing a primary material collection receiver for partially dedusting an influent stream laden with asbestos or other hazardous material, comprising a vacuum tank;

an inner foraminous tubular shell comprising a substantially rigid perforated tube positioned substantially concentrically within said vacuum tank, said inner shell defining an array of pneumatic vacuum passageways;

an outer, flexible, substantially solid, imperforate bag, positioned within and against said inner shell, said outer bag having an open end defining an outer access opening;

an inner, flexible, foraminous bag positioned with the interior of said outer bag, said inner bag having a neck with an inner access opening positioned substantially concentrically within said outer access opening, said inner bag defining an array of fluid flow passageways spaced rearwardly of said inner access openings, and said fluid flow passageways being of a size and distribution for substantially blocking and preventing passage of large asbestos fibers and large particulates of other hazardous material while permitting passage of air and water containing smaller particulates of asbestos and other hazardous material;

a tank outlet tube extending substantially radially outwardly and and upwardly from said vacuum tank;

an annular chamber positioned between said inner shell and said vacuum tank for connecting said outer access opening to said outlet tube; and a drain pipe extending substantially radially outwardly and downwardly from said vacuum tank;

an inlet tube extending into said inner access opening of said inner bag;

a detachable collar for detachably connecting and compressibly securing said inner bag about and against said inlet tube;

a two stage, second filtering compartment having a first stage comprising an upper nozzle chamber and a second stage comprising a lower filter chamber, said lower filter chamber containing a set of tubular filter spaced along side of each other for partially filtering the partially dedusted stream as the partially dedusted stream moves laterally and radially inwardly through said tubular filters to provide an upwardly flowing partially filtered stream containing a lesser concentration of particulates of asbestos or other hazardous material than the influent partially dedusted stream; and said upper nozzle chamber being connected to and communicating with said outlet tube of said first bulk separator compartment and said lower filter chamber, said upper nozzle chamber having an overhead array of downwardly facing nozzles and a radial filter outlet tube, said nozzles comprising a central nozzle and a substantially circular set of nozzles radially surrounding and cooperating with said central nozzle for directing the partially dedusted stream in a downwardly flow pattern about said tubular filters in said lower filter chamber;

a third, one stage filtering compartment connected to and communicating with said filter outlet tube of said second compartment, said third compartment comprising a Hepa-type filter for substantially dedusting and removing the remaining particulates of asbestos and other hazardous material from said partially filtered stream; and a discharge conduit for discharging dedusted air;

a fourth collector compartment comprising a dust settlement chamber connected to and in communication with said second compartment for receiving the filtered particulates of asbestos and other hazardous material from said second compartment, said dust settlement chamber comprising a settling tank providing a collection basin with a ceiling and a floor;

a moveable vertical wall providing a piston slidably positioned adjacent said ceiling and floor of said collection basin;

an elongated rod connected to said piston for reciprocatingly pushing and sliding said piston to compress said removed particulates of asbestos and other hazardous material;

a gathering portion for receiving said compressed particulates of asbestos and other hazardous material;

a pair of substantially vertical end air tubes positioned in said gathering portion to fascilitate discharge of said gathered asbestos and other hazardous material; and a detachable hose for attachment to one of said vertical end air tubes and said inlet tube of said first compartment for passage of said compressed asbestos and other hazardous material into said inner bag of said first bulk separator compartment; and a vacuum pump selected from the group consisting of an air blower, fan, pneumatic pump, and compressor, connected to said discharge outlet of said third compartment for drawing asbestos or other hazardous material from an external area laden with asbestos or other hazardous material through said inlet conduit into said first bulk separator compartment.

8. A vacuum loader in accordance with claim 7 wherein said first compartment further includes a substantially solid, imperforate shroud, said shroud comprising:

an annular end extending diametrically outwardly from said inner shell at a location in proximity to said outer access opening; and an elongated annular skirt extending rearwardly from said annular end to said tank outlet tube to provide a protective barrier for covering the pneumatic vacuum passageways of said inner shell to substantially prevent backflow contamination of the exterior surface of said outer bag.

9. A vacuum loader in accordance with claim 8 wherein said outer bag comprises a double ply membrane bag and said inner bag is selected from the group consisting of a perforated plastic bag or a permeable fabric bag.

10. A vacuum loader in accordance with claim 11 wherein said vacuum tank comprises:

a pivotable door for access to and removal of said bags; and a vacuum tank relief valve operatively connected to and extending from said door for facilitating opening of said door.

11. A vacuum loader in accordance with claim 10 wherein said first compartment further includes a closure plate comprising a substantially circular disk for engaging said open end of said outer bag and closing said outer access opening when said inner bag is substantially filled with asbestos or other hazardous material, a forklift-receiving eyelet extending longitudinally outwardly from said closure plate to facilitate removal of said bags, and at least one spring for urging said open end of said outer bag against said closure plate.

12. A vacuum loader in accordance with claim 7 wherein said lower filter chamber of said second compartment includes a set of injectors for periodically injecting intermittent blasts of air upon said tubular filters to help clean said tubular filters.

13. A vacuum loader in accordance with claim 7 including a material packing, vacuum relief valve operatively connected to and extending from said inlet tube for permitting a surge of air to enter and substantially clean said inlet tube and compress said particulates of asbestos and other hazardous material in said inner bag.

14. A vacuum loader in accordance with claim 13 including a wheeled trailer having a frame assembly for supporting said compartments and said vacuum pump, said frame assembly comprising a tubular peripheral reservoir connected to said drain pipe of said vacuum tank for receiving contaminated water.

15. A process for removing asbestos or other hazardous material, comprising the steps of:

drawing an influent stream laden with asbestos or other hazardous material through an inlet tube to an inner, flexible, foraminous bag;

collecting asbestos fibers or large particulates of other hazardous material in said inner bag to partially dedust said stream;

passing said partially dedusted stream comprising air and water containing smaller particulates of asbestos or other hazardous material through the sides of said inner bag;

directing said partially dedusted stream forwardly from said inner bag through the access opening of an outer, solid, imperforate bag positioned radially outwardly and annularly enclosing said inner bag;

annularly conveying said partially dedusted stream rearwardly from said access opening of said outer bag along the outside of said outer bag through the outlet tube of a vacuum tank to a two stage, filtering compartment;

injecting said partially dedusted stream in a downward flow pattern from the upper nozzle stage of said two stage, filtering compartment to the lower filter stage of said two stage, filtering compartment;

partially filtering said partially dedusted stream with a set of tubular filters in the lower filter stage of said two stage, filtering compartment by forcing said stream laterally and radially through said tubular filters to remove some of said asbestos or other hazardous material;

drawing said partially filtered stream upwardly from said set of tubular filters and through a filter outlet tube in the upper nozzle stage of the two stage, filtering compartment into a one stage filtering compartment;

substantially removing the remaining particulates of asbestos or other hazardous material from said partially filtering stream by directing said partially filtered stream through a Hepa-type filter;

collecting the filtered asbestos or other hazardous material in a collector compartment comprising a dust settlement chamber;

gathering the filtered asbestos or other hazardous material in the dust settlement chamber with a reciprocating piston;

vacuuming the compressed asbestos or other hazardous material in said dust settlement chamber and conveying the vacuumed asbestos or other hazardous material to said inner bag for sealed disposal;

sealing said outer bag about said inner bag by closing the access opening of said outer bag with a closure plate and securing the closure plate to the sides of the outer bag;

attaching a hook to an eyelet extending outwardly from the closure plate; and pulling the hook attached to the eyelet of the closure plate with a forklift truck to remove the sealed bags from the vacuum tank for safe disposal without substantially exposing surrounding personnel to the collected asbestos and other hazardous material contained in the sealed bags.

16. A process in accordance with claim 15 including substantially preventing the asbestos or other hazardous material from contacting the outer exterior surface of said outer bag.

17. A process in accordance with claim 16 including draining contaminated water from said vacuum tank into a tubular frame of a trailer.

18. A vacuum loader for removing asbestos and other hazardous material, comprising:

a first bulk separator compartment providing a primary collection receiver for partially dedusting an influent stream laden with asbestor or other hazardous material, said first bulk separator compartment comprising a tank containing a substantially solid imperforate outer bag and a foraminous, fluid permeable inner bag, said inner bag comprising a sieve-like membrane defining a set of fluid flow passageways for substantially permitting passage of air and liquid containing smaller particulates of asbestos or other hazardous material while substantially blocking and preventing passage of larger particulates of asbestos and other hazardous material;

an inlet conduit connected to said first bulk separator compartment for feeding influent air or other fluid carrying asbestos or other hazardous material to said bulk separator compartment;

a second filtering compartment comprising a filter chamber, said filter chamber containing a set of filters for partially filtering the partially dedusted stream as the partially dedusted stream moves laterally and radially inwardly through said filters to provide a partially filtered steam containing a lesser concentration of particulates of asbestos or other hazardous material than the influent partially dedusted stream, said second filtering compartment communicating with said first bulk separator compartment;

a third, one stage filtering compartment connected to and positioned downstream of said second compartment and comprising a filter for substantially dedusting and removing the remaining particulates of asbestos and other hazardous material from said partially filtered stream;

a discharge conduit extending from said third filtering compartment for discharging dedusted air; and a vacuum pump selected from the group consisting of an air blower, fan, pneumatic pump, and compressor, connected to said discharge conduit for drawing asbestos or other hazardous material from an external area laden with asbestos or other hazardous material into said first bulk separator compartment.

* * * * *